May 17, 1966 D. W. RUBY 3,251,938
AUTOMATIC GAIN CONTROL SYSTEM
Filed Aug. 1, 1962
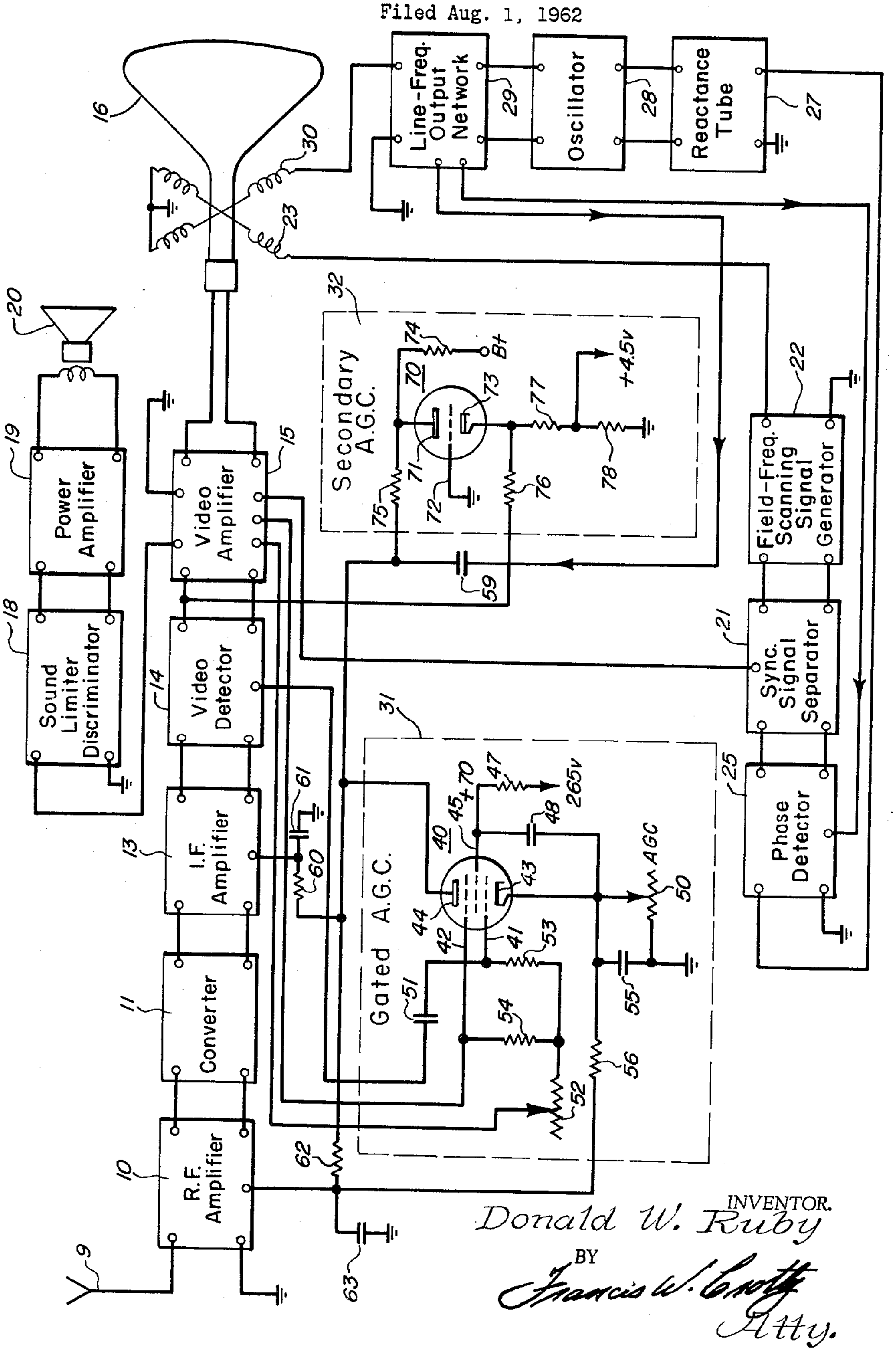
INVENTOR.
Donald W. Ruby
BY
Francis W. Crotty
Atty.

United States Patent Office 3,251,938

Patented May 17, 1966

3,251,938
AUTOMATIC GAIN CONTROL SYSTEM

Donald W. Ruby, Hoffman Estates, Roselle, Ill., assignor to Zenith Radio Corporation, Chicago, Ill., a corporation of Delaware Filed Aug. 1, 1962, Ser. No. 213,954
5 Claims. (Cl. 178—7.3)

This invention relates, in general, to television circuitry but is more particularly related to an automatic gain control system for use in a television receiver.

In a conventional television receiver it is well known to employ an automatic gain control circuit (AGC) which operates to increase or decrease the gain of the radio-frequency and/or intermediate-frequency stages to retain the output signal of the second detector at a substantially constant level. A constant-level output signal prevents changes in contrast of the reproduced image resulting from selective fading and intensity variations of the type associated with weak signals.

While there are several methods of providing an AGC control potential for varying the gain of television receivers, in almost all instances, the AGC systems use the detected video signal to determine the level of the incoming signal. When the level of the detected signal decreases in value, the gain of the receiver is increased. Conversely, when the signal level at the second detector increases, the gain is decreased.

It is of importance that the AGC system be immune to noise and several well known techniques are employed to achieve that end. For example, a gated circuit which derives a gating pulse from the horizontal deflection transformer during retrace may be used to control the AGC network to sample the output signal of the second detector. Conventional circuits of this type cause sampling to occur only during the synchronizing pulses of the transmitted signal which, of course, are coincident in time with the retrace pulses of the transformer. Other AGC circuits, which do not employ gating techniques utilize time constant circuits to effect a response only to the synchronizing pulse portions of the detected video signal.

The previously described circuits work satisfactorily when a primary signal alone is intercepted by the television receiver; however, the receiver may also receive reflected primary signals due to the presence of passing aircraft. When the reflected and primary signals are both detected, the direct current level of the detector output varies and a corresponding change in picture contrast results. When the reflected signals are attributable to passing aircraft, the relative phases of the reflected and primary signals change and a varying periodic change in intensity of the reproduced image, commonly designated as "airplane flutter," results. Prior AGC circuits are not able to control the receiver to nullify the conjoint effect of the reflected and primary signals.

It is, therefore, an object of this invention to provide a new and improved automatic gain control circuit.

It is further an object of this invention to provide an automatic gain control circuit which reduces the deleterious effects produced by reflected television signals.

It is a further object of this invention to provide an automatic gain control system which reduces the "airplane flutter" effect in television receivers.

In accordance with the invention, an automatic gain control system is provided for a television receiver which, during normal operating conditions, receives a primary signal and which, during abnormal operating conditions, concurrently receives a reflection of that signal. The control system comprises a video detector and a variable gain amplifying device for applying the primary signal to the detector. Additionally, the system comprises a first keyed gain-control arrangement for developing in response to the primary signal a first gain-control potential and coupled to the amplifying device to vary its gain inversely with intensity variations of the primary signal. Furthermore, a second gain-control arrangement is provided which is coupled to the detector and which includes means for rendering the second gain control arrangement responsive to substantially only the direct current level of the detector output signal for developing during abnormal operating conditions a second gain-control potential. Finally, there are means for utilizing the second control potential concurrently to vary the gain of the amplifying device.

The features of this invention which are believed to be novel are set forth with particularity in the appended claims. The invention, together with further objects and advantages thereof, may best be understood, however, by reference to the following description taken in conjunction with the accompanying drawing, the single figure of which is a schematic diagram of a television receiver embodying the automatic gain control circuitry of the invention.

The receiver, as shown, comprises an antenna 9 coupled to a variable gain radio-frequency amplifier 10 of one or more stages which includes means for selecting a particular one of the transmitted signals available in the receiver location. The selected signal is coupled from amplifier 10 to a converter 11 which develops an intermediate-frequency signal. The output of the converter is translated to a variable gain intermediate-frequency amplifier 13 of one or more stages and a video detector 14 is coupled thereto to receive the amplified intermediate-frequency signal. Amplifiers 10 and 13 may be considered to include adjustable gain devices for amplifying the received television signal, whether that be the modulated primary signal alone or the primary accompanied by a reflected signal. Coupled to the output of video detector 14 is a video amplifier 15 which translates the amplified video components of the received signal to a cathode-ray tube or other image reproducing device 16. An intercarrier-sound signal component, also developed in detector 14 and amplified by video amplifier 15, is translated to a limiter-discriminator 18 coupled between amplifier 15 and a power amplifier 19. A speaker 20 is coupled to the output of power amplifier 19 in conventional fashion.

Video amplifier 15 is further provided with an output for translating detected field and line synchronizing signal components present in the received television signal. A synchronizing-signal-separator 21 is coupled to this output and provides information for synchronizing the scanning apparatus associated with image reproducing device 16. A field-frequency scanning signal generator 22 is coupled to one output of synchronizer-signal-separator 21 and energizes conventional field-frequency scanning coils 23. The line-frequency system of the receiver comprises the series arrangement of a phase detector 25, a reactance tube 27, an oscillator 28 and a line frequency output network 29. Oscillator 28 produces a local signal which is variable in phase by frequency adjustment of the oscillator in conventional fashion. Conventional line-frequency deflection coils 30 are coupled to the line-frequency output network 29. In addition, line-frequency output network 29 provides a feedback signal to phase detector 25. Furthermore, a conventional automatic gain control network 31 and a secondary automatic gain control network 32, both of which will be described more fully hereinafter, are provided to vary the gain of amplifier stages 10 and 13.

The described receiver, except for its automatic gain control arrangement, is conventional. Incoming composite television signals intercepted by antenna 9 are applied to and amplified by radio-frequency amplifier 10. The selected signal is delivered to converter 11 which heterodynes it with locally generated oscillations to develop an intermediate-frequency signal which is amplified by amplifier 13. This amplified signal is applied to video detector 14 which derives the synchronizing, video and sound components. These components are translated to video amplifier 15 which supplies amplified video components for use by image reproducer 16. The sound components in the form of a frequency-modulated intercarrier signal are supplied to limiter and discriminator 18, wherein the audio components are derived and, after amplification by power amplifier 19, they drive speaker 20 which produces the audio portion of the telecast.

The synchronizing components applied by detector 14 are amplified by amplifier 15 and separated into field and line components by network 21, the field frequency components being translated to generator 22 which provides a deflection signal for the field or vertical yoke 23. The horizontal synchronizing output of signal separator 21 serves as a source of reference signal which is applied to phase detector 25. The detector comprises means for comparing the phase of the reference signal and a local signal of horizontal-frequency generator 28 to produce an error signal indicative of their phase relation. The error signal developed in the phase detector is applied to reactance tube 27 which controls the operating frequency of generator 28 to maintain synchronization. The output of generator 28 is applied to network 29 which supplies a deflection signal to horizontal yoke 30.

More particular consideration will now be given to gated AGC network 31 which serves as a portion of an automatic gain control system for the receiver which, during normal operating conditions, receives a primary signal but which, during abnormal operating conditions, concurrently receives a reflection of that signal. The network is of conventional construction and includes a double control grid type tube 40, such as one-half of a 6BU8, having two control grids 41 and 42 spaced on opposite sides of a screen grid 45, a cathode 43 and a plate 44. A decoupling circuit, comprising a resistor 47 and a capacitor 48, couples the screen grid to a potential source B+ to bias it to a predetermined potential in order to accelerate the electron flow of the cathode beyond the first grid. The cathode returns to ground through an adjustable self-biasing network comprising a variable resistor 50 and a bypass capacitor 55.

A negative going detected composite video signal from detector 14 is applied to first control grid 41 by way of a coupling capacitor 51 which prevents the direct current component of the composite signal from reaching the grid. This grid is returned to a positive potential source by means of a leak resistor 53 which is in series with a variable resistor 52 having a tap that connects to the screen bias network of amplifier 15. Amplifier 15 supplies a positive going composite video signal to second control electrode 42 by means of a direct current connection as illustrated. A grid-leak resistor 54 connects control grid 42 to the junction of resistors 52 and 53.

The plate 44 of tube 40 is returned to cathode 43 through resistors 62 and 56. A first integrating network, including a resistor 60 and a capacitor 61 is coupled between plate 44 and I.F. amplifier 13 while a second integrating network, comprising resistor 62 and a capacitor 63, is coupled between plate 44 and R.F. amplifier 10. These integrating networks develop the gain-control potential for application to the R.F. and I.F. amplifiers. A retrace pulse derived from line frequency output network 29 is applied to plate 44 by way of a capacitor 59 and the operating biases are adjusted to the end that tube 40 conducts only for the duration of the retrace pulse. Tube 40 and its associated components serve as a first keyed gain-control arrangement which develops in response to a received primary signal a first gain-control potential and which is coupled to amplifiers 10 and 13 to vary their gain inversely with intensity variations of the primary signal.

The operation of gated AGC network 31 is best described in Patent 2,814,671—issued to Robert Adler et al. and assigned to the same assignee as the present invention. It is sufficient to say that network 31 produces an AGC potential only during the horizontal retrace pulse applied to plate 44 of tube 40. Integrating networks 62, 63 and 60, 61 integrate the pulses of potential developed during conductive intervals of tube 40 to provide a gain control voltage for amplifier stages 10 and 13.

The secondary AGC network 32, included in the receiver in accordance with the invention, comprises a triode amplifier 70 having a plate 71, a control grid 72 and a cathode 73. B+ potential is applied to plate 71 by way of a polarizing resistor 74 which determines the operating point of the tube and also comprises part of the plate load. A coupling resistor 75 is connected between plate 71 of tube 70 and plate 44 of tube 40. The grid 72 is coupled to ground while cathode 73 is direct current coupled to video detector 14 and receives a negative going composite signal therefrom by way of an input signal coupling resistor 76. Also, the cathode is coupled to ground through series connected resistors 77, 78 and a positive polarity biasing potential of approximately 4.5 volts is applied to the junction of resistors 77, 78. Tube 70 is operated as a direct current amplifier so that substantially no alternating current components of the composite video signal appear in its plate load although the D.C. potential of the plate varies in accordance with the D.C. level of the detected signal from detector 14. Tube 70 and its associated components constitute a second gain-control arrangement coupled to detector 14 and responsive to substantially only the D.C. level of the detector output signal for developing, especially during abnormal operating conditions in which reflections of the primary signal are present, a second gain-control potential. Integrating networks 60, 61 and 62, 63 utilize this second control potential concurrently with the first-mentioned gain control potential to vary the gain of amplifiers 10, 13. The gain-control potentials of networks 31 and 32 are of positive polarity, however, the tubes of amplifiers 10 and 13 are biased such that their cathodes are of slightly higher positive potential than their grids, thereby effectively producing a net negative bias.

In operation, during periods when no reflected signals are present, tube 70 conducts and establishes a polarizing potential on plate 44 of tube 40, otherwise network 32 has no material effect on normal AGC operation. Its influence during abnormal operating conditions in which reflections are concurrently received with the primary signal varies in accordance with the relative phase of the primary and reflected signals. When the reflected signal is in phase with the primary signal, the magnitude of the D.C. component of the output signal of detector 14 is increased. Unless compensated, this brings about a corresponding increase in the contrast of the reproduced image. However, for the assumed condition the cathode 73 of tube 70 is driven more negative, increasing the conduction of the tube. The plate voltage of tube 70 decreases and reduces the voltage of the AGC bus and integrating networks 60, 61 and 62, 63. This decreases the gain of amplifiers 10 and 13 to limit the increase in the detector output voltage and the contrast of the reproduced image.

On the other hand, should the reflected signal be out of phase with the primary, the direct current component of the detected signal is reduced and tube 70 becomes less conductive thereby causing its plate voltage to increase. This increased potential is translated to the AGC bus through resistor 75 and causes an increase in the gain of amplifiers 10 and 13. The phase relationship of the primary and reflected signals may vary between these two extreme conditions and AGC network 32 compensates for both tending to maintain the reproduced image of relatively uniform contrast. This compensation effectively eliminates "airplane flutter."

Due to the presence of network 32, the time constants of integrating network 60, 61 and 62, 63 may be substantially shortened compared to similar networks of gated AGC systems as network 32 provides a control signal when network 31 is inoperative. With this arrangement the AGC system operates much faster and substantially no variations in intensity are observable in the reproduced image when reflected signals are present.

Merely by way of illustration and in no sense by way of limitation, the following component values may be employed in the described AGC arrangement:

| | | |
|---|---|---|
| Resistor **47** | ohms | 22,000 |
| Resistor **50** | do | 10,000 |
| Resistor **52** | megohms | 5 |
| Resistor **53** | ohms | 330,000 |
| Resistor **54** | megohms | 3.3 |
| Resistor **56** | ohms | 680,000 |
| Resistor **60** | do | 680,000 |
| Resistor **62** | megohms | 2.2 |
| Resistor **74** | ohms | 680,000 |
| Resistor **75** | megohms | 1.5 |
| Resistor **76** | ohms | 15,000 |
| Resistor **77** | do | 10,000 |
| Resistor **78** | do | 270 |
| Capacitor **48** | microfarads | 1 |
| Capacitor **51** | do | .1 |
| Capacitor **55** | do | .01 |
| Capacitor **59** | do | .001 |
| Capacitor **61** | do | .047 |
| Capacitor **63** | do | .033 |
| Tube **40** | ½ | (6BU8) |
| Tube **70** | | 6C4 |
| B+ supply | volts | 265 |

Furthermore, it should be noted that solid state devices may be readily employed in lieu of tubes 40 and 70.

Thus, the invention provides a new and improved automatic gain control circuit which reduces deleterious effects in the reproduced image resulting from reflected television signals.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An automatic gain control system for a television receiver which, during normal operating conditions, receives a primary signal and which, during abnormal operating conditions, concurrently receives a reflection of said signal, said system comprising:

a video detector;

a variable gain amplifying device for applying said primary signal to said detector;

a first keyed gain-control arrangement for developing in response to said primary signal a first gain-control potential and coupled to said amplifying device to vary its gain inversely with intensity variations of said primary signal;

a second gain-control arrangement coupled to said detector; means included in said second gain control arrangement for rendering the latter responsive to substantially only the direct current level of the detector output signal for developing during said abnormal operating conditions a second gain-control potential;

and means for utilizing said second control potential concurrently to vary the gain of said amplifying device.

2. an automatic gain control system for a television receiver which, during normal operating conditions, receives a primary signal and which, during abnormal operating conditions, concurrently receives a reflection of said signal, said system comprising:

a video detector;

a variable gain amplifying device for applying said primary signal to said detector;

a first keyed gain-control arrangement for developing in response to said primary signal a first gain-control potential and coupled to said amplifying device to vary its gain inversely with intensity variations of said primary signal;

a direct current amplifier coupled to said detector; means included in said direct current amplifier for rendering the latter responsive to substantially only the direct current level of the detector output signal for developing during said abnormal operating conditions a second gain-control potential;

and means for utilizing said second control potential concurrently to vary the gain of said amplifying device.

3. An automatic gain control system for a television receiver which, during normal operating conditions, receives a primary signal and which, during abnormal operating conditions, concurrently receives a reflection of said signal, said system comprising:

a video detector;

a variable gain amplifying device for applying said primary signal to said detector;

a first keyed gain-control arrangement including an integrating network for developing a first gain-control potential in response to said primary signal and coupled to said amplifying device to vary its gain inversely with intensity variations of said primary signal;

a second gain-control arrangement coupled to said detector and to said integrating network; means included in said second gain control arrangement for rendering the latter responsive to substantially only the direct current level of the detector output signal for developing during said abnormal operating conditions a second gain-control potential to vary the gain of said amplifying device.

4. An automatic gain control system for a television receiver which, during normal operating conditions, receives a primary signal and which, during abnormal operating conditions, concurrently receives a reflection of said signal, said system comprising:

a video detector;

a variable gain amplifying device for applying said primary signal to said detector;

a first keyed gain-control arrangement, coupled to said detector for developing in response to said primary signal a first gain-control output potential to vary the gain of said amplifying device inversely with intensity variations of said primary signal, a first electron device included in said keyed arrangement having an output electrode and an integrating network coupled to said electrode;

a second gain-control arrangement including a second electron device having an input electrode coupled to said detector; means included in said second gain control arrangement for rendering the latter responsive to substantially only the direct current level of the detector output signal for developing at the output electrode of said second device during said abnormal operating conditions an output potential level determined by the relative phase of said primary and reflected signals for application to said integrating network to vary the gain of said amplifying device;

and means for applying the output potentials of said first second gain control arrangements directly to said variable gain amplifying device.

5. An automatic gain control system for a television receiver which, during normal operating conditions, receives a primary signal and which, during abnormal operating conditions, concurrently receives a reflection of said signal, said system comprising:

a video detector;

a variable gain amplifying device for applying said primary signal to said detector;

a first keyed gain-control arrangement, coupled to said detector, for developing in response to said primary signal a first gain-control output potential to vary the gain of said amplifying device inversely with intensity variations of said primary signal, a first electron device included in said keyed arrangement having an output electrode and an integrating network coupled to said electrode;

a second gain-control arrangement including a second electron device having cathode and output electrodes;

a high impedance load circuit coupled to said output electrode and included in said second gain-control arrangement for rendering the latter responsive to substantially only the direct current level of the detector output signal to develop at the output electrode of said second device during said abnormal operating conditions an output potential level determined by the relative phase of said primary and reflected signals for application to said integrating network to vary the gain of said amplifying device;

means coupled between said second gain-control arrangement and said detector for translating at least the direct current component of the detected signal to said cathode electrode;

and conductor means interconnecting said output electrodes for translating said output potentials to said integrating network for varying the gain of said amplifying device.

References Cited by the Examiner

UNITED STATES PATENTS

| | | | |
|---|---|---|---|
| 2,735,002 | 2/1956 | Keizer et al. | 178—7.3 |
| 2,735,004 | 2/1956 | Keizer et al. | 178—7.5 |
| 2,810,825 | 10/1957 | Keizer et al. | 178—7.5 |

DAVID G. REDINBAUGH, *Primary Examiner.*

J. A. O'BRIEN, J. McHUGH, *Assistant Examiners.*